United States Patent
Yoshimatsu (10) Patent No.: US 9,941,716 B2
(45) Date of Patent: Apr. 10, 2018

(54) PROTECTION SWITCH CIRCUIT, CHARGING CIRCUIT, AND ELECTRONIC DEVICE

(71) Applicant: ROHM CO., LTD., Ukyo-ku, Kyoto (JP)

(72) Inventor: Yusaku Yoshimatsu, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 197 days.

(21) Appl. No.: 14/842,264

(22) Filed: Sep. 1, 2015

(65) Prior Publication Data

US 2016/0072322 A1    Mar. 10, 2016

(30) Foreign Application Priority Data

Sep. 4, 2014   (JP) .................................. 2014-180392

(51) Int. Cl.
    *H02J 7/00*    (2006.01)
(52) U.S. Cl.
    CPC .......... *H02J 7/0031* (2013.01); *H02J 7/0086* (2013.01)
(58) Field of Classification Search
    USPC ........................................................ 320/164
    See application file for complete search history.

(56) References Cited

U.S. PATENT DOCUMENTS

| | | | |
|---|---|---|---|
| 2007/0210758 A1* | 9/2007 | Gangstoe | H02J 7/0031 320/134 |
| 2010/0060232 A1* | 3/2010 | Boyles | H02J 7/0027 320/107 |
| 2011/0121783 A1* | 5/2011 | Boyles | H02J 7/0013 320/113 |
| 2012/0212185 A1* | 8/2012 | Tanaka | H02J 7/0021 320/136 |
| 2016/0118821 A1* | 4/2016 | Takeda | H02J 7/0031 320/134 |
| 2016/0190835 A1* | 6/2016 | Kageyama | H02J 7/0029 320/136 |

FOREIGN PATENT DOCUMENTS

JP    2014108017 A    6/2014

* cited by examiner

*Primary Examiner* — Mohammed Alam
(74) *Attorney, Agent, or Firm* — Cantor Colburn LLP (57) ABSTRACT

A protection switch circuit includes: an input terminal configured to receive a DC input voltage; an output terminal; a switch provided between the input terminal and the output terminal; a determination circuit configured to compare the input voltage with N threshold voltages (N is a natural number); and a gate controller configured to control the switch based on a comparison result of the determination circuit, wherein the determination circuit includes: an OTPROM (One Time Programmable Read Only Memory) to which N pieces of setting data indicative of each of the N threshold voltages are written under software control, and a comparison circuit configured to compare the input voltage with each of the N threshold voltages according to the N pieces of the setting data written to the OTPROM.

5 Claims, 7 Drawing Sheets

PROTECTION SWITCH CIRCUIT, CHARGING CIRCUIT, AND ELECTRONIC DEVICE

CROSS-REFERENCE TO RELATED APPLICATION

The present invention claims priority under 35 U.S.C. § 119 to Japanese Application No. 2014-180392, filed on Sep. 4, 2014, the entire content of which is incorporated herein by reference.

TECHNICAL FIELD

The present disclosure relates to a protection switch circuit.

BACKGROUND

Figure 1:
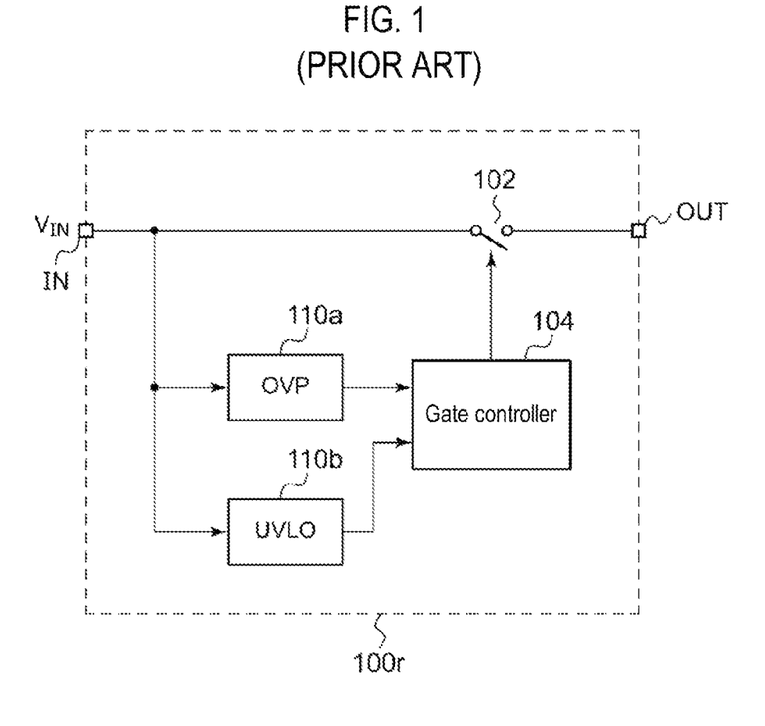
FIG. 1 shows a circuit diagram of a protection switch circuit that the present inventors have studied.

When a DC voltage is supplied into one terminal (e.g., an input terminal), it may be desired to switch states between the one terminal and another terminal (e.g., an output terminal) from an electrically-conductive state to a cut-off state, based on a voltage level of the DC voltage. In such applications, a protection switch circuit is used. FIG. 1 shows a circuit diagram of a protection switch circuit that the present inventors have studied.

A protection switch circuit $100r$ has an input (IN) terminal and an output (OUT) terminal. If an input voltage $V_{IN}$ input to the IN terminal falls within a predetermined voltage range, a state between the IN terminal and the OUT terminal of the protection switch circuit $100r$ becomes conductive. The protection switch circuit $100r$ includes a switch 102, a gate controller 104, an overvoltage protection (OVP) circuit $110a$, and an undervoltage lockout circuit $110b$.

The switch 102 is provided between the IN terminal and the OUT terminal. The overvoltage protection circuit $110a$ compares the input voltage $V_{IN}$ with a threshold $V_{OVP}$ for overvoltage protection. The threshold $V_{OVP}$ corresponds to an upper limit of a voltage range. The undervoltage lockout circuit $110b$ compares the input voltage $V_{IN}$ with a threshold $V_{UVLO}$ for undervoltage lockout. The threshold $V_{UVLO}$ corresponds to a lower limit of the voltage range. The gate controller 104 turns on the switch 102 if $V_{UVLO} < V_{IN} < V_{OVP}$ or turns off the switch 102 if $V_{IN} < V_{UVLO}$ or $V_{OVP} < V_{IN}$, according to outputs from the overvoltage protection circuit $110a$ and the undervoltage lockout circuit $110b$.

In the protection switch circuit $100r$ of FIG. 1, it may be desired to adjust the thresholds $V_{UVLO}$ and $V_{OVP}$. In a system where a power supply voltage, in addition to the input voltage $V_{IN}$, is constantly supplied to the protection switch circuit $100r$, the thresholds $V_{UVLO}$ and $V_{OVP}$ may be adjusted, since the protection switch circuit $100r$ includes built-in registers to store setting data indicative of the thresholds $V_{UVLO}$ and $V_{OVP}$ so that the setting data may be written to the built-in registers by an external processor.

However, in another system where an input voltage $V_{IN}$ is used as a power supply voltage of protection switch circuits $100r$, it is not possible to read from or write to registers if the input voltage $V_{IN}$ is not supplied to the protection switch circuits $100r$. In such a system, an adjusting method of the thresholds $V_{UVLO}$ and $V_{OVP}$ by hardware processing is adopted. A fuse-trimming by laser cutting, a zapping by fusing the aluminum wiring by an electric current or the like are examples of hardware processing.

Such hardware processing causes the manufacturing cost of a protection switch circuit $100r$ to increase. In addition, since the hardware processing may be performed only during the manufacturing process of the protection switch circuit $100r$, a user of the protection switch circuits $100r$, in other words, a manufacturer of a set apparatus equipped with the protection switch circuit $100r$ may not adjust the thresholds.

SUMMARY

Embodiments of the present disclosure provide a protection switch circuit to adjust the thresholds without hardware processing.

According to one embodiment of the present disclosure, there is provided a protection switch circuit. The protection switch circuit includes an input terminal to receive a DC input voltage, an output terminal, a switch provided between the input terminal and the output terminal, a determination circuit to compare the input voltage with N threshold voltages (N is a natural number), and a gate controller to control the switch based on a comparison result of the determination circuit. The determination circuit includes an OTPROM (One Time Programmable Read Only Memory) to which N pieces of setting data indicative of each of N threshold voltages can be written under software control, and a comparator circuit that compares the input voltage with each of the N threshold voltages according to the N pieces of the setting data written to the OTPROM.

According to this embodiment, the threshold voltages may be set under software control. In this manner, a hardware processing becomes unnecessary. This causes manufacturing cost to decrease. In addition, the threshold voltages may be set by a manufacturer (e.g., chip vendor) before shipment as well as a user after shipment.

The setting data indicative of a first threshold voltage and a second threshold voltage respectively corresponding to an upper limit and a lower limit of a normal voltage range where the switch is turned on, may be written to the OTPROM. The comparison circuit is capable of comparing the input voltage with each of the first threshold voltage and the second threshold voltage.

The comparison circuit may include N voltage divider circuits corresponding to the N pieces of the setting data and N comparators corresponding to the N pieces of the setting data. Each of the voltage divider circuits divides the input voltage by a voltage dividing ratio according to the corresponding setting data, and each of the comparators compares an output voltage of the corresponding voltage divider circuit with a predetermined reference voltage.

The voltage divider circuit may include a plurality of resistors connected in series between the input terminal and a ground line and a plurality of bypass switches provided in parallel with the plurality of resistors. The plurality of bypass switches may be set to be turned on or turned off according to the corresponding setting data.

The protection switch circuit may be integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors, etc. for adjustment of a circuit constant may be provided outside the semiconductor substrate. By integrating the circuit as a single chip, it is possible to reduce a circuit area and uniformly maintain characteristics of circuit elements.

According to another embodiment of the present disclosure, there is provided an electronic device. The electronic device includes any one of the protection switch circuits as mentioned above.

According to another embodiment of the present disclosure, there is provided a charging circuit to charge a secondary battery by an external DC power supply and supply electric power to a load. The charging circuit includes a DC input terminal to receive a DC voltage from the DC power supply, a battery terminal which the secondary battery is removably connected to, a system terminal to which the load is connected, a charging transistor provided between the system terminal and the battery terminal, a charging controller to control a gate voltage of the charging transistor, a switch provided between the DC input terminal and the system terminal, a determination circuit that compares an input voltage of the DC input terminal with N threshold voltages (N is a natural number), and a gate controller that controls the switch based on a comparison result of the determination circuit. The determination circuit includes an OTPROM (One Time Programmable Read Only Memory) to which N pieces of setting data indicative of each of the N threshold voltages can be written under software control, and a comparator circuit that compares the input voltage with each of the N threshold voltages according to the N pieces of the setting data written to the OTPROM.

The setting data indicative of a first threshold voltage and a second threshold voltage corresponding respectively to an upper limit and a lower limit of a normal voltage range where the switch is turned on may be written to the OTPROM. The comparison circuit may be configured to compare the input voltage with each of the first threshold voltage and the second threshold voltage.

The comparison circuit may include N voltage divider circuits corresponding to the N pieces of the setting data and N comparators corresponding to the N pieces of the setting data. Each of the voltage divider circuits divides the input voltage by a voltage dividing ratio according to the corresponding setting data, and each of the comparators compares an output voltage of the corresponding voltage divider circuit with a predetermined reference voltage.

The voltage divider circuit may include a plurality of resistors connected in series between the input terminal and a ground line, and a plurality of bypass switches provided in parallel with the plurality of resistors. The plurality of bypass switches may be set to be turned on or turned off according to the corresponding setting data.

The switch may include one or more transistors. The gate controller is capable of adjusting a gate voltage of the transistor such that a voltage of the system terminal approaches a predetermined target voltage.

The setting data indicative of the target voltage may be written to the OTPROM under software control.

The gate controller may be configured to adjust a gate voltage of the transistor such that an electric current flowing through the transistor does not exceed an overcurrent threshold.

The setting data indicative of the overcurrent threshold may be a written to the OTPROM under software control.

The OTPROM may include a power-on reset circuit to reset memory cells of the OTPROM if the input voltage is lower than a threshold voltage for power-on reset.

The charging circuit may be integrated on a single semiconductor substrate.

According to another embodiment of the present disclosure, there is provided an electronic device. The electronic device includes a secondary battery, and any one of the charging circuits as mentioned above to charge the secondary battery.

Further, arbitrary combinations of the components described above and substitutions of the components or expressions of the present disclosure among methods, devices, systems, etc. are also effective as aspects of the present disclosure.

DETAILED DESCRIPTION

Various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are not intended to limit the present disclosure, and are provided for the purpose of illustration, and all features and combinations thereof described in the embodiments should not be necessarily construed as describing the gist of the present disclosure.

As used herein, the expression "a member A is connected with a member B" may mean that the member A is physically and directly connected to the member B, or that the member A is indirectly connected to member B via another member without substantially affecting the electrical connection or without harming the functionality or effects that may be achieved by the connection.

Similarly, the expression "a member C is interposed between a member A and a member B" may indicate that the member A is directly connected to the member C or the member B is directly connected to the member C, and that the members are indirectly connected via another member without substantially affecting the electrical connection or without harming the functionality or effects that may be achieved by the connections.

Figure 2:
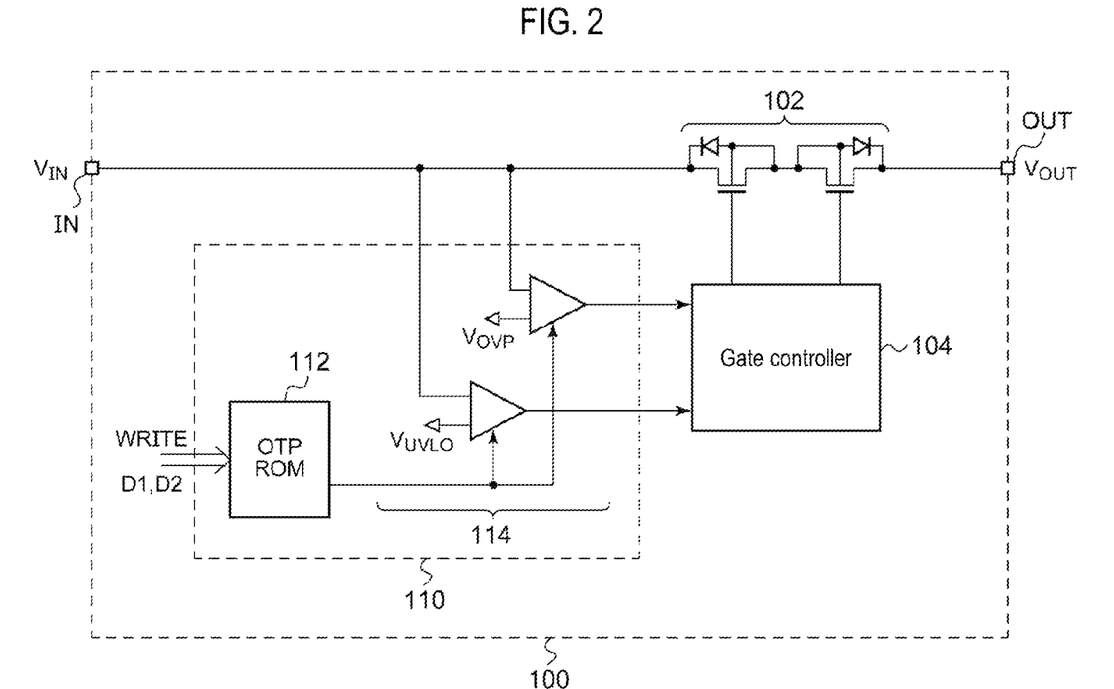
FIG. 2 shows a circuit diagram of a switch circuit according to one embodiment of the present disclosure.

FIG. 2 shows a circuit diagram of a protection switch circuit 100 according to one embodiment of the present disclosure. The protection switch circuit 100 has an input (IN) terminal and an output (OUT) terminal. A state between the IN terminal and the OUT terminal of the protection switch circuit 100 may be switched between an electrically-conductive state and a cut-off state, based on an input voltage $V_{IN}$ of the IN terminal. In other words, the IN terminal and the OUT terminal are electrically conducted (ON) when the input voltage $V_{IN}$ falls within a predetermined normal voltage range or cut off (OFF) when the input voltage $V_{IN}$ falls out of the normal voltage range, thereby protecting circuit elements inside the protection switch circuit 100 as well as a load connected to the OUT terminal.

The protection switch circuit 100 includes a switch 102, a gate controller 104 and a determination circuit 110. The protection switch circuit 100 is integrated on a single semiconductor substrate. The switch 102 is provided between the IN terminal and the OUT terminal. For example, the switch 102 may be a bi-directional switch that includes two N-channel MOSFETs connected in anti-series to each other. Accordingly, a reverse current from the OUT terminal to the IN terminal is prevented. Further, it is possible to improve stability by using the N-channel MOSFET, since the N-channel MOSFET may be in a normally-off state if a gate voltage of the N-channel MOSFET is a ground voltage.

The determination circuit 110 compares the input voltage $V_{IN}$ of the IN terminal with each of N threshold voltages (N is a natural number). The determination circuit 110 generates a detection signal S1 based on such comparison results. For example, the determination circuit 110 determines whether the input voltage $V_{IN}$ falls within a normal voltage range. When the input voltage $V_{IN}$ falls within the normal voltage range, the determination circuit 110 asserts the detection signal S1 (for example, the detection signal having a high level). In this embodiment, for N=2, the determination circuit 110 has a function of a window comparator that compares the input voltage $V_{IN}$ with each of an upper limit voltage $V_{OVP}$ (a threshold voltage for overvoltage protection) and a lower limit voltage $V_{UVLO}$ (a threshold voltage for undervoltage lockout) of the normal voltage range.

The gate controller 104 controls the switch 102 based on comparison results of the determination circuit 110, in other words, the detection signal S1. Specifically, the gate controller 104 turns on the switch 102 when the detection signal S1 is asserted or turns off the switch 102 when the detection signal S1 is negated. It is necessary to apply a gate voltage $V_G$ higher than $V_{IN}+V_{THN}$ to gates of the transistors included switch 102 in order to turn on the switch 102. $V_{THN}$ is a gate-source threshold voltage of an N-channel MOSFET. The gate controller 104 may include a charge pump circuit to step-up the input voltage $V_{IN}$ in order to generate the voltage $V_G$ higher than the input voltage $V_{IN}$.

The protection switch circuit 100 operates using the input voltage $V_{IN}$ of the IN terminal as a power supply voltage. Thus, the determination circuit 110 and the gate controller 104 need to be operable immediately when the input voltage $V_{IN}$ is supplied to the IN terminal, thereby determining a level of the input voltage $V_{IN}$ and controlling the switch 102 to be turned on or turned off based on a result of the determination.

The determination circuit 110 includes an OTPROM (One Time Programmable Read Only Memory) 112 and a comparison circuit 114. N pieces of setting data D1 to DN indicative of N threshold voltages $V_{TH1}$ to $V_{THN}$, respectively, may be written to the OTPROM 112 under software control. In this embodiment, for N=2, $V_{TH1}$ and $V_{TH2}$ correspond to the $V_{OVP}$ and $V_{UVLO}$, respectively.

Figure 3:
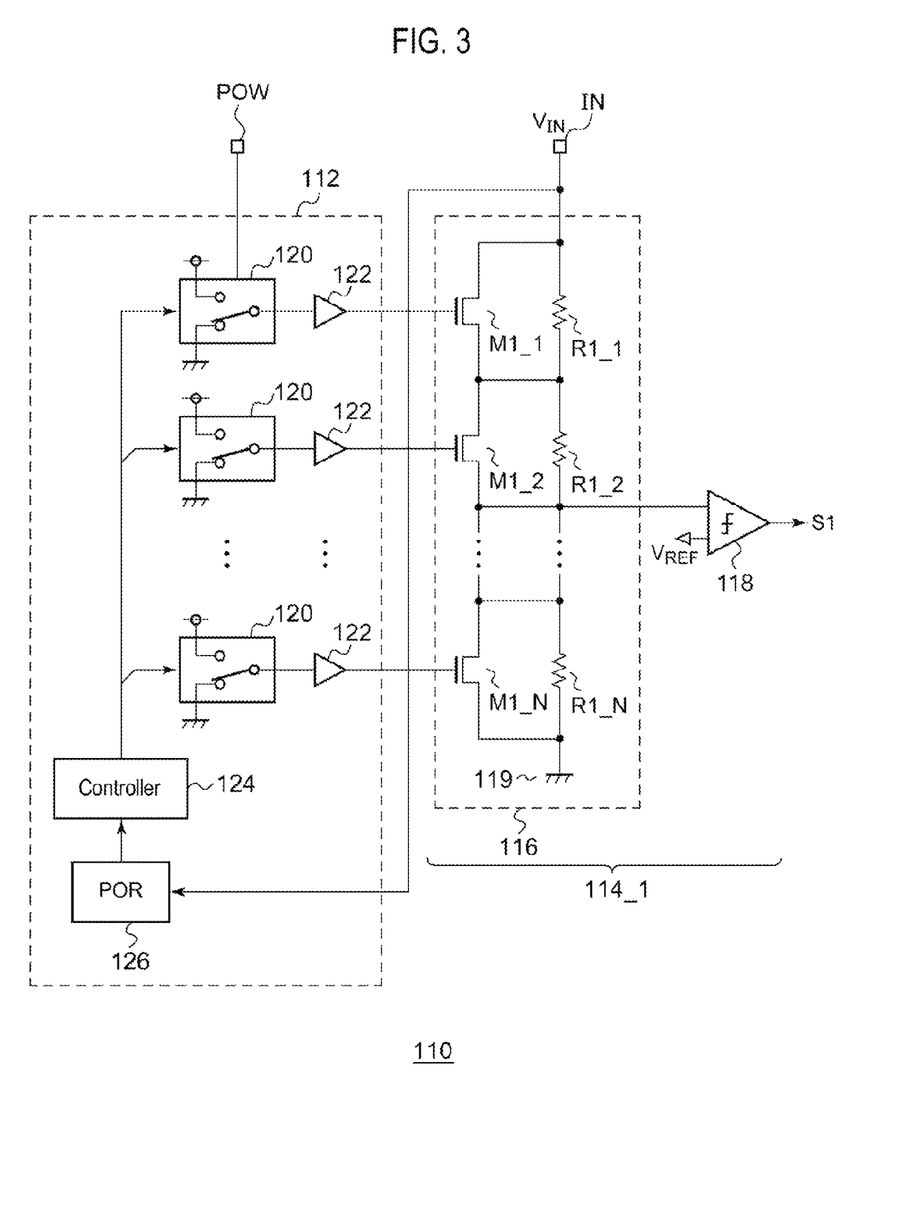
FIG. 3 shows a circuit diagram illustrating a specific configuration of a determination circuit.

FIG. 3 shows a circuit diagram illustrating a specific configuration of the determination circuit 110. The OTPROM 112 includes a plurality of memory cells 120, a plurality of read buffers 122, a memory controller 124 and a power-on reset (POR) circuit 126. FIG. 3 shows only a configuration corresponding to the setting data D1. In fact, there is provided a similar configuration corresponding to the setting data D2.

The memory cells 120 store binary data constituting the setting data D1 of the threshold voltage $V_{OVP}$. Writing operation for the memory cells 120 can be performed only once. When a power supply voltage for the writing operation is supplied to a power supply terminal POW, the memory controller 124 provides values (1 or 0) to be stored in each of the memory cells 120 such that the setting data D1 is written to the memory cells 120. For data writing to the OTPROM 112, known techniques may be used.

The comparison circuit 114 includes N voltage divider circuits 116 corresponding to N pieces of the setting data and N comparators 118 corresponding to N pieces of the setting data. FIG. 3 shows only a set of the voltage divider circuits 116 and a comparator 118 corresponding to the setting data D1.

The voltage divider circuit 116 divides the input voltage $V_{IN}$ by a voltage dividing ratio according to the corresponding setting data D1. The comparator 118 compares an output voltage of the corresponding voltage divider circuit 116 with a predetermined reference voltage $V_{REF}$.

When a voltage diving ratio $\alpha_i$ (<1) corresponds to an $i^{th}$ setting data Di, the comparator 118 compares $V_{IN} \times \alpha_i$ with $V_{REF}$. This is equivalent to comparing the input voltage $V_{IN}$ with a threshold voltage $V_{THi}$ that is $V_{REF}/\alpha_i$.

The voltage dividing circuits 116 include a plurality of resistors R1_1 to R1_m (m is a natural number) connected in series between a ground line 119 and the IN terminal, and a plurality of bypass switches M1_1 to M1_m (m is a natural number) provided in parallel with the plurality of resistors R1_1 to R1_m. The plurality of bypass switches M1_1 to M1_m are turned on or turned off according to the setting data written to the OTPROM 112.

The power-on reset circuit 126 compares the input voltage $V_{IN}$ with a threshold voltage $V_{POR}$ for power-on reset, and asserts a power-on reset (POR) signal if it is determined that $V_{IN} < V_{POR}$. If the POR signal is asserted, the memory controller 124 resets the memory cells 120 of the OTPROM 112. Then, for example, if the input voltage $V_{IN}$ exceeds the threshold voltage $V_{POR}$ or if a predetermined time has elapsed, the memory controller 124 releases the reset of the memory cells 120 and enables the memory cells 120 to be in a state where programmed values are readable from the memory cells 120. When the values are readable from the memory cells 120, the bypass switches M1_1 to M1_m are set to be turned on or turned off according to the setting data.

The protection switch circuit 100 is configured as mentioned above. Subsequent applications of the protection switch circuit 100 will be described.

First Embodiment of Application

According to one embodiment of application of the present disclosure, a manufacturer (e.g., chip vendor) of a protection switch circuit 100 performs an operation of writing setting data D1 to DN indicative of N threshold voltages $V_{TH}$ to an OTPROM 112 during a manufacturing process before shipment. The setting data D1 to DN may be determined to cancel variations in threshold voltages due to variations in a semiconductor process. Alternatively, the setting data D1 to DN may be determined on demand from a manufacturer of a supply destination of the protection switch circuit 100.

According to the protection switch circuit 100, it is possible to decrease manufacturing cost since a conventional hardware processing becomes unnecessary. In addition, since the threshold voltages $V_{TH}$ may be set or adjusted under software control without hardware processing, there may be provided not only the first embodiment of application but a second embodiment of application.

Second Embodiment of Application

According to another embodiment of application of the present disclosure, a supply destination (e.g., a purchaser or user) of a protection switch circuit 100 performs an operation of writing setting data D1 to DN indicative of N threshold voltages $V_{TH}$ to an OTPROM 112 after shipment of the protection switch circuit 100. In this case, the setting data D1 to DN may be determined freely based on a purpose of a platform where the user uses a protection switch circuit 100.

As such, the protection switch circuit 100, which is not provided conventionally, is used in the first embodiment of this disclosure as well as the second embodiment of this disclosure. In this manner, it is possible to improve a commercial value of the protection switch circuit 100 from a viewpoint of a purchaser (e.g., a user) of the protection switch circuit 100.

Subsequently, the modification of the protection switch circuit 100 will be described.

(First Modification)

Figure 4:
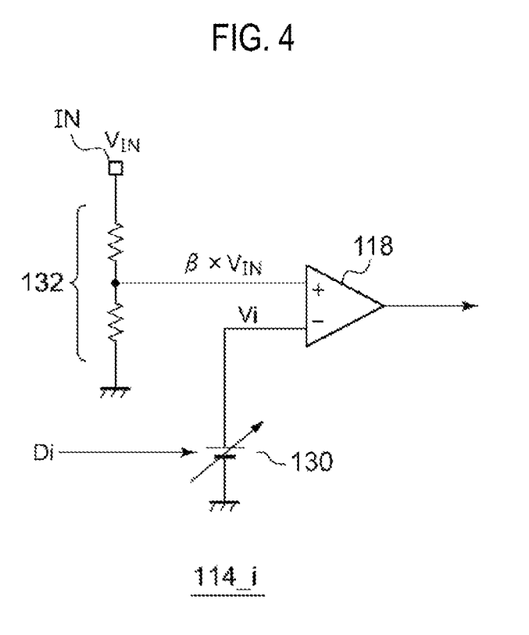
FIG. 4 shows a circuit diagram of a comparator circuit according to a first modification.

FIG. 4 shows a circuit diagram of a comparator circuit 114_i according to a first modification of the present disclosure. The comparator circuit 114_i compares an input voltage $V_{IN}$ with an $i^{th}$ threshold voltage $V_{THi}$ (1≤i≤N). The comparison circuit 114_i includes a comparator 118, a variable voltage source 130, and a voltage divider circuit 132. The voltage divider circuit 132 divides the input voltage $V_{IN}$ by a predetermined dividing ratio β (<1). The variable voltage source 130 generates a voltage Vi according to a corresponding setting data Di written to OTPROM 112. The comparator 118 compares an output voltage $β×V_{IN}$ of the voltage divider circuit 132 with the voltage Vi. As such, comparing $β×V_{IN}$ with the voltage Vi is equivalent to comparing $V_{IN}$ with Vi/β. In other words, the comparison circuit 114_i is capable of comparing the input voltage $V_{IN}$ with a threshold voltage $V_{THi}$ that is Vi/β. Thus, it is possible to adjust the threshold voltage according to the setting data Di written to an OTPROM 112.

(Second Modification)

A switch 102 may include P-channel MOSFETs instead of N-channel MOSFETs.

(Use)

Subsequently, use of a protection switch circuit according to some embodiments of the present disclosure will be described below. The protection switch circuit 100, along with a charging circuit to charge the secondary battery, is mounted on an electronic device.

Figure 5:
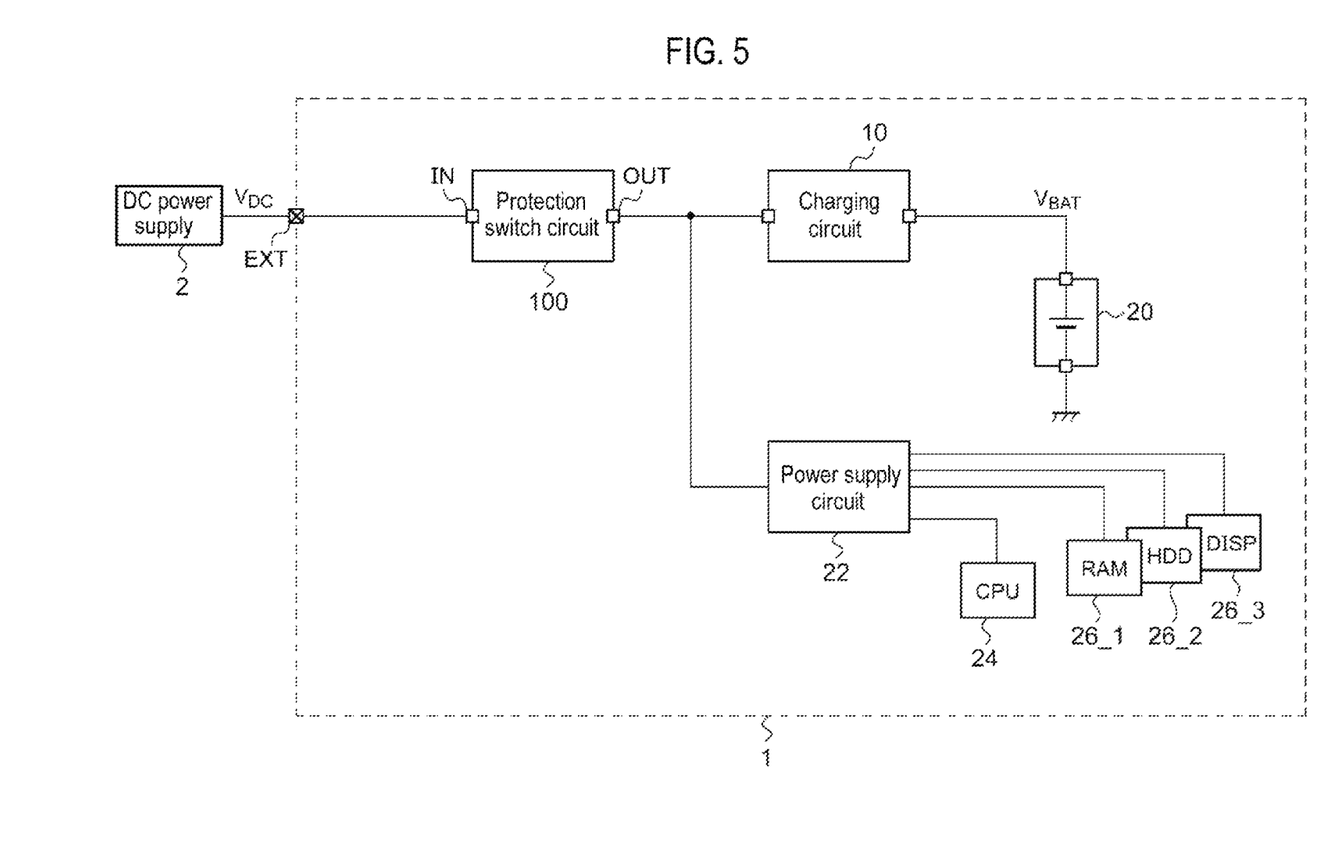
FIG. 5 shows a circuit diagram of an electronic device.

FIG. 5 shows a circuit diagram of an electronic device 1. The electronic device 1 includes a protection switch circuit 100, a charging circuit 10, a secondary battery 20, a power supply circuit 22, a CPU 24 and a plurality of peripheral circuits 26. The secondary battery 20 is a lithium ion battery, a nickel hydrogen battery, etc. The secondary battery 20 outputs a battery voltage $V_{BAT}$.

A plurality of peripheral circuits 26 include a memory (RAM: Random Access Memory), a hard disk, a display, etc. A DC power supply 2 such as an AC adapter or a USB host is removably connected to an external power supply (EXT) terminal of the electronic device 1, and supplies a DC voltage $V_{DC}$ to the EXT terminal.

When the DC power supply 2 is connected to the EXT terminal, the DC voltage $V_{DC}$ is supplied to an IN terminal of the protection switch circuit 100. When the DC voltage $V_{DC}$ falls within a normal voltage range, the protection switch circuit 100 is brought into a conductive state to output the DC voltage $V_{DC}$ from an output terminal OUT of the protection switch circuit 100. Then, the DC voltage $V_{DC}$ is supplied to the charging circuit 10 and the power supply circuit 22. The charging circuit 10 receives the DC voltage $V_{DC}$ via the protection switch circuit 100 and charges the secondary battery 20.

When the DC power supply 2 is not connected to the EXT terminal or when the DC power supply 2 is connected to the EXT terminal but the DC voltage $V_{DC}$ falls out of the normal voltage range, the protection switch circuit 100 is brought into a cut-off state. At this time, the charging circuit 10 supplies the battery voltage $V_{BAT}$ from the secondary battery 20 to the power supply circuit 22.

The power supply circuit 22 receives the DC voltage $V_{DC}$ from the protection switch circuit 100 or the battery voltage $V_{BAT}$ from the charging circuit 10. Then, the power supply circuit 22 steps up or steps down the received voltage to generate a power supply voltage $V_{DD}$, which is supplied to a CPU 24 and peripheral circuits 26 as loads. The power supply circuit 22 includes a DC/DC converter, a charge pump circuit, a linear regulator (LDO: Low Drop Output), etc.

Figure 6:
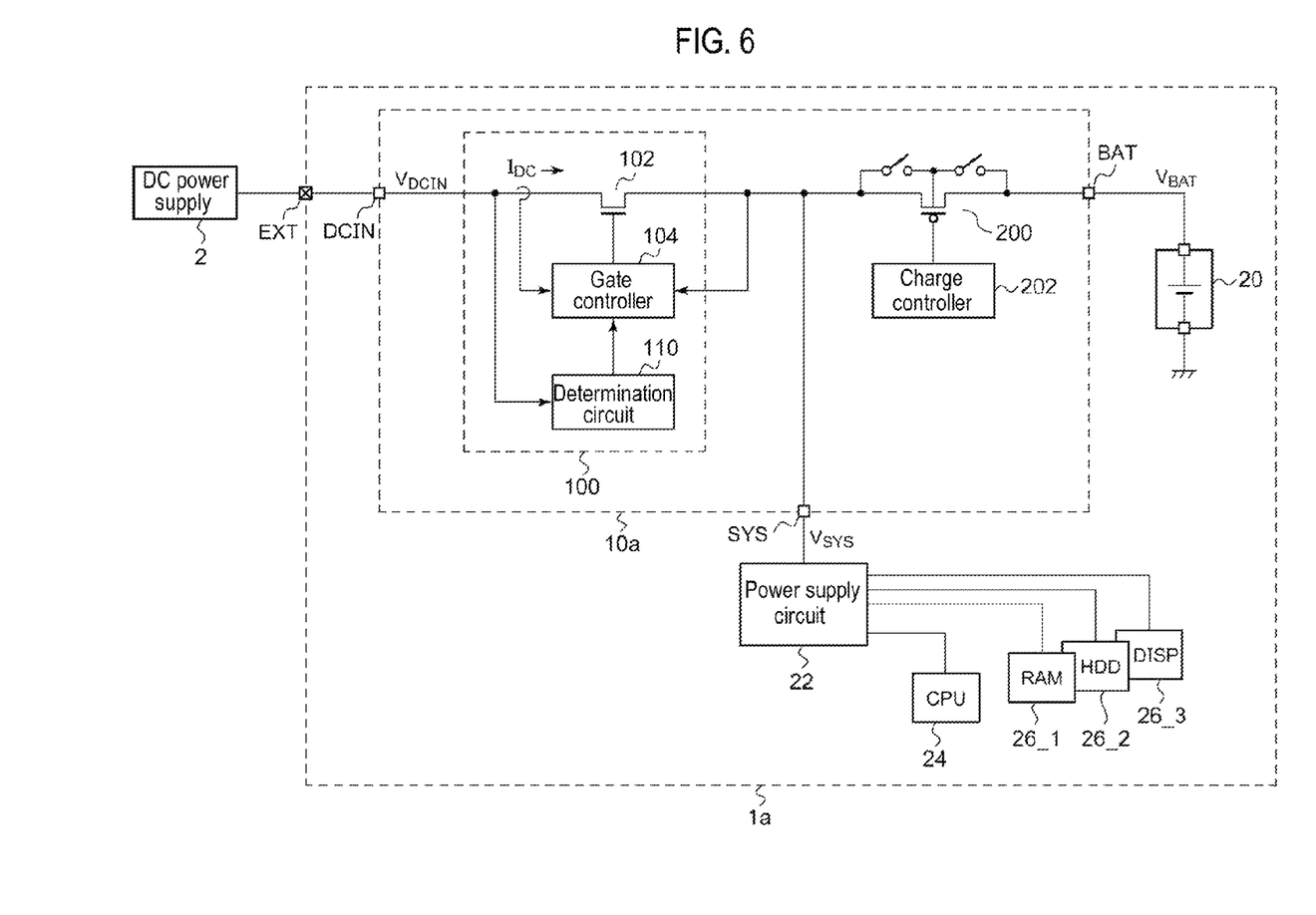
FIG. 6 shows a circuit diagram of a charging circuit including a protection switch circuit.

The protection switch circuit 100 of FIG. 5 may be integrated on the charging circuit 10. FIG. 6 shows a circuit diagram of a charging circuit 10a including a protection switch circuit 100. An external DC power supply 2 supplies power to a power supply circuit 22 as a load, while charging a secondary battery 20.

The charging circuit 10a includes a protection switch circuit 100, a charging transistor 200, and a charge controller 202. The charging circuit 10a is a functional IC integrated on a single semiconductor substrate.

A DC voltage $V_{DC}$ from a DC power supply 2 is input to a DC input (DCIN) terminal. The secondary battery 20 is removably connected to a battery (BAT) terminal. The power supply circuit 22 as a load is connected to a system (SYS) terminal.

The switch 102 is provided between the DCIN terminal and the SYS terminal. The determination circuit 110 compares an input voltage $V_{DCIN}$ of the DCIN terminal with N threshold voltages $V_{TH1}$ to $V_{THN}$ (where N is a natural number). The gate controller 104 controls a switch 102 based on comparison results of the determination circuit 110. The configuration including the switch 102, the gate controller 104 and the determination circuit 110 corresponds to the protection switch circuit 100 as mentioned above. The determination circuit 110 is configured as mentioned above an explanation of which will not be repeated.

The switch 102 includes a transistor. The switch 102 may include two N-channel MOSFETs connected in anti-series to each other. The gate controller 104 is capable of adjusting a gate voltage of the transistor included in the switch 102 so that a system voltage $V_{SYS}$ of the SYS terminal approaches a predetermined target voltage during a period when the voltage $V_{DCIN}$ of the DCIN terminal falls within a predetermined normal voltage range, that is, when the switch 102 is turned on. In other words, the gate controller 104 and the switch 102 constitute a linear regulator.

Further, the gate controller 104 is capable of adjusting the gate voltage of the transistor included in the switch 102 so that a current $I_{DC}$ flowing through the transistor included in the switch 102 does not exceed an overcurrent threshold $I_{OCP}$.

The target voltage of the system voltage $V_{SYS}$ may be written to the OTPROM of the determination circuit 110 under software control. Further, the setting data indicative of the overcurrent threshold $I_{OCP}$ may be written to the OTPROM of the determination circuit 110 under software control.

The charging transistor 200 is provided between the SYS terminal and a BAT terminal. The charge controller 202 controls a gate voltage $V_G$ of the charging transistor 200 when a DC power supply 2 is connected to the EXT terminal and supplies a normal DC voltage $V_{DC}$.

Figure 7:
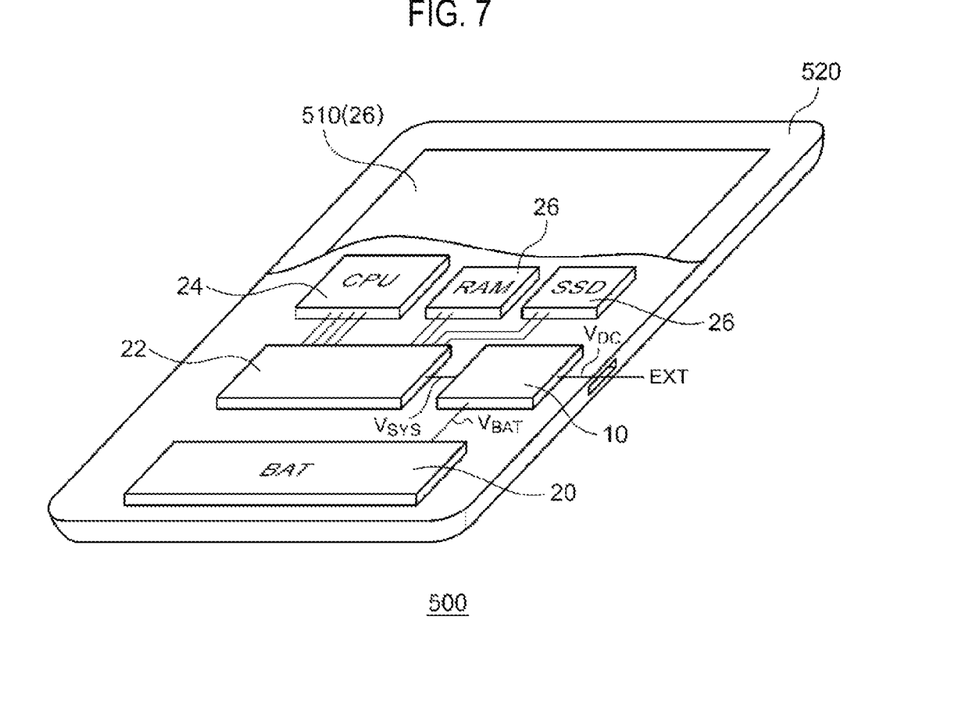
FIG. 7 shows a perspective view of an electronic device including the charging circuit of FIG. 6.

FIG. 7 shows a perspective view of an electronic device 500 including the charging circuit 10 of FIG. 6. For example, the electronic device 500 is a tablet terminal, a smartphone, etc. A CPU 24, a RAM, a peripheral circuit 26 such as an SSD (Solid State Drive), a secondary battery 20, a power supply circuit 22, and a charging circuit 10 may be incorporated in a housing 520. The power supply circuit 22 may supply power to a display panel 510, a driver thereof, an audio circuit and the like, in addition to the CPU 24, the RAM and the SSD. The electronic device 500 may be a notebook PC, a console gaming device, a portable gaming device, a wearable PC, a portable audio player, a digital camera, etc.

According to some embodiments of the present disclosure, it is possible to adjust thresholds without hardware processing.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A protection switch circuit comprising:
   an input terminal configured to receive a DC input voltage;
   an output terminal;
   a switch provided between the input terminal and the output terminal;
   a determination circuit configured to compare the input voltage with N threshold voltages (N is a natural number); and
   a gate controller configured to control the switch to be turned on or off based on a comparison result of the determination circuit,
   wherein the determination circuit includes:
   an OTPROM (One Time Programmable Read Only Memory) to which N pieces of setting data that are indicative of the N threshold voltages, respectively, are written under software control, and
   a comparison circuit configured to compare the input voltage with each of the N threshold voltages according to the N pieces of the setting data written to the OTPROM,
   wherein the setting data indicative of a first threshold voltage and a second threshold voltage corresponding respectively to an upper limit and a lower limit of a normal voltage range where the switch is turned on are written to the OTPROM, and
   wherein the comparison circuit is configured to compare the input voltage with each of the first threshold voltage and the second threshold voltage.

2. The protection switch circuit of claim 1, wherein the comparison circuit includes:
   N voltage divider circuits corresponding to the N pieces of the setting data, each of the voltage divider circuits dividing the input voltage by a voltage dividing ratio according to the corresponding setting data; and
   N comparators corresponding to the N pieces of the setting data, each of the comparators comparing an output voltage of the corresponding voltage divider circuit with a predetermined reference voltage.

3. The protection switch circuit of claim 2, wherein each of the voltage divider circuits includes:
   a plurality of resistors connected in series between the input terminal and a ground line; and
   a plurality of bypass switches provided in parallel with the plurality of resistors,
   wherein the plurality of bypass switches are set to be turned on or turned off according to the corresponding setting data.

4. The protection switch circuit of claim 1, wherein the protection switch circuit is integrated on a single semiconductor substrate.

5. An electronic device comprising the protection switch circuit of claim 1.

* * * * *